United States Patent
Kobayashi et al.

(10) Patent No.: US 6,465,075 B2
(45) Date of Patent: Oct. 15, 2002

(54) BIAXIALLY ORIENTED LAMINATE POLYESTER FILM

(75) Inventors: Ieyasu Kobayashi, Sagamihara (JP); Toshifumi Osawa, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/895,215

(22) Filed: Jul. 2, 2001

(65) Prior Publication Data

US 2001/0051257 A1 Dec. 13, 2001

Related U.S. Application Data

(62) Division of application No. 09/519,843, filed on Mar. 6, 2000, now Pat. No. 6,319,589.

(30) Foreign Application Priority Data

Mar. 4, 1999 (JP) .............................. 11-056830
Mar. 5, 1999 (JP) .............................. 11-058309

(51) Int. Cl.[7] .......................... B32B 27/08; B32B 27/20; B32B 27/36
(52) U.S. Cl. .................... 428/141; 428/212; 428/213; 428/215; 428/216; 428/323; 428/480; 428/694 ST; 428/694 SG; 428/910
(58) Field of Search ...................... 428/141, 212, 428/213, 215, 216, 323, 480, 694 ST, 694 SG, 910

(56) References Cited

U.S. PATENT DOCUMENTS 4,615,939 A * 10/1986 Corsi et al. ................. 428/323
4,798,759 A * 1/1989 Dallman et al. ............. 428/220
5,919,550 A * 7/1999 Koseki et al. ............... 428/141
6,319,589 B1 * 11/2001 Kobayashi et al. .......... 428/141

FOREIGN PATENT DOCUMENTS

| EP | 0 567 973 A1 | 11/1993 |
| EP | 0 572 224 A1 | 12/1993 |
| EP | 0 609 060 A1 | 8/1994 |
| EP | 0 786 765 A2 | 7/1997 |
| EP | 0 845 351 A2 | 6/1998 |
| EP | 0 893 249 A2 | 1/1999 |
| JP | 62-248131 A * | 10/1987 |
| JP | 04-033853 A * | 2/1992 |
| JP | 06-076268 A * | 3/1994 |
| JP | A-9-314781 | 12/1997 |
| JP | A-11-34262 | 2/1999 |
| JP | A-11-314333 | 11/1999 |
| JP | A-2000-43213 | 2/2000 |
| JP | A-2000-43214 | 2/2000 |

* cited by examiner

*Primary Examiner*—Vivian Chen
(74) *Attorney, Agent, or Firm*—Sughrue Mion, PLLC

(57) ABSTRACT

A biaxially oriented laminate polyester film (1) has a first polyester layer having a thickness ($t_A$) of 0.3 to 5 μm and a second polyester layer containing an inert fine particle lubricant and having a thickness ($t_B$) of 1.5 to 9 μm, or (2) has a first polyester layer having a thickness ($t_A$) of 2 to 8.5 μm and a second polyester layer containing an inert fine particle lubricant and having a thickness ($t_B$) of 0.6 to 5 μm. The polyester of the second polyester layer may contain a recovered polyester having the same composition as a recovered laminate polyester film which is the biaxially oriented laminate polyester film or an unstretched film thereof.

15 Claims, 1 Drawing Sheet

BIAXIALLY ORIENTED LAMINATE POLYESTER FILM

This is a divisional of application Ser. No. 09/519,843, filed Mar. 6, 2000 U.S Pat. No. 6,319,589, the disclosure of which is incorporated herein by reference.

DETAILED DESCRIPTION OF THE INVENTION

The present invention relates to a biaxially oriented laminate polyester film. More specifically, it relates to a biaxially oriented laminate polyester film which can be self-recycled and has excellent electromagnetic conversion characteristics, winding properties and handling properties as a base film for a high-density magnetic recording medium.

A biaxially oriented polyester film typified by a polyethylene terephthalate film is used for a wide range of application, particularly as a base film for a magnetic recording medium due to its excellent physical and chemical properties.

Along with recent efforts made to increase the density and capacity of a magnetic recording medium, a more flat and thinner base film is now in demand. However, when the surface of a base film is flattened to retain excellent electromagnetic conversion characteristics, its slipperiness becomes insufficient. For instance, when the base film is rolled up, it is wrinkled or blocking occurs. As a result, the surface of the film roll becomes uneven, whereby the yield of products is reduced, or appropriate ranges of tension, contact pressure and speed for winding up the base film are narrowed, thereby making it extremely difficult to wind up the base film. When the slipperiness of the base film is low in the film processing step, the friction of the base film with a metal roll in contact with the base film increases, thereby generating chippings which cause lack of a magnetic recording signal, that is, a drop-out.

To improve the slipperiness of a polyester film, the following methods are generally employed: (i) one in which inert particles are deposited into a raw material polymer from the residual catalyst in the production process and (ii) one in which the surface of a film is made uneven by adding inert particles to the film. Generally speaking, the greater the size or content of particles in the film the more the slipperiness is improved.

As described above, the surface of a base film is desired to be as even as possible in order to improve electromagnetic conversion characteristics. When a magnetic recording medium is formed from a base film having a rough surface, the roughness of the surface of the base film appears on the surface of a magnetic layer even after the formation of the magnetic layer, thereby deteriorating electromagnetic conversion characteristics. In this case, the larger the size or content of particles contained in the base film the greater the surface roughness of the base film becomes and the more the electromagnetic conversion characteristics deteriorate.

To improve both winding properties and electromagnetic conversion characteristics which are conflicting properties, there is widely known means of producing a laminate film having an even surface on which a magnetic layer is formed for improving electromagnetic conversion characteristics and an opposite rough surface for improving slipperiness.

For the flat layer on which the magnetic layer is formed, a lubricant having a small particle diameter is used or the amount of the lubricant added is reduced to flatten the layer, whereas for the rough layer on the opposite side (running side) on which no magnetic layer is formed, a lubricant having a large particle diameter is used or the amount of the lubricant added is increased to roughen the layer.

That is, the flat layer on the coated side and the rough layer on the running side greatly differ from each other in the characteristic properties of a lubricant used, e.g., the type, particle diameter and amount of the lubricant.

In the case of a single-layer film, film waste generated in the production process of a film is recovered and formed into a chip which can be recycled for the production of the film. In the case of the above laminate film, the lubricant composition of a chip recovered from the laminate film differs from the lubricant compositions of a rough layer and a flat layer. Therefore, when the recovered chip is recycled for the production of a laminate film, the lubricant composition of a layer made from the recovered chip changes and affects the characteristic properties of the film.

It has recently been proposed to reuse a chip recovered from the laminate film for an intermediate layer portion (core layer portion) of a three-layer laminate film.

However, in this method, the intermediate layer portion must be thick enough to enable the recovery of a chip from the laminate film in addition to the recovery of a chip from the three-layer laminate film. Therefore, the three-layer laminate film must be made extremely thick. Even when a recovered chip containing a lubricant having a large particle diameter or a large amount of a lubricant is used in an intermediate portion, it influences the formation of protrusions on a surface layer portion. Therefore, the use of the chip is limited.

As described above, a magnetic recording medium having a higher density and a larger capacity and a base film having a smaller thickness have recently been desired. Therefore, the above three-layer laminate film becomes also thin and accordingly, it is substantially difficult to reuse a polymer (chip) recovered from the above laminate film in the intermediate layer of the above three-layer laminate film.

Therefore, as matters now stand, the polymer recovered from the laminate film is inevitably discarded, thereby boosting the costs of the film. Such discarded films are disposed of as industrial waste but it is becoming difficult to dispose of such films at present.

It is therefore an object of the present invention to provide a biaxially oriented laminate polyester film which can be self-recycled, has excellent winding and handling properties and is useful as a base film for a high-density magnetic recording medium having excellent electromagnetic conversion characteristics.

The other objects and advantages of the present invention will become apparent from the following description.

According to the present invention, firstly, the above objects and advantages of the present invention can be attained by a biaxially oriented laminate polyester film (may be referred to as "first laminate film of the present invention" hereinafter) comprising a first polyester layer and a second polyester layer, wherein the first polyester layer has a thickness ($t_A$) of 0.3 to 5 μm, the second polyester layer contains an inert fine particle lubricant and has a thickness ($t_B$) of 1.5 to 9 μm, and the first polyester layer and the second polyester layer satisfy the following expressions (1) to (4):

$$WRa(B) > WRa(A) \qquad (1)$$

$$0.5 \leq t_B/t \leq 0.9 \qquad (2)$$

$$10 < t_B/d_B \leq 60 \qquad (3)$$

$$t = 3 \text{ to } 10 \text{ μm} \qquad (4)$$

wherein WRa(A) is the center plane average roughness (nm) of the exposed surface of the first polyester layer, WRa(B)

is the center plane average roughness (nm) of the exposed surface of the second polyester layer, $t_B$ is the thickness ($\mu$m) of the second polyester layer, t is the sum of $t_A$ and $t_B$, $t_A$ is the thickness ($\mu$m) of the first polyester layer, and $d_B$ is the average particle diameter ($\mu$m) of the inert fine particle lubricant contained in the second polyester layer.

Secondly, the above objects and advantages of the present invention are attained by a biaxially oriented laminate polyester film (may be referred to as "second laminate film of the present invention" hereinafter) comprising a first polyester layer and a second polyester layer, wherein the first polyester layer has a thickness ($t_A$) of 2 to 8.5 $\mu$m, the second polyester layer contains an inert fine particle lubricant and has a thickness ($t_B$) of 0.6 to 5 $\mu$m, and the first polyester layer and the second polyester layer satisfy the following expressions (1) to (4'):

$$WRa(B) > WRa(A) \tag{1}$$

$$0.15 \leq t_B/t < 0.5 \tag{2'}$$

$$10 < t_B/d_B \leq 45 \tag{3'}$$

$$t = 4 \text{ to } 10 \; \mu m \tag{4'}$$

wherein WRa(A) is the center plane average roughness (nm) of the exposed surface of the first polyester layer, WRa(B) is the center plane average roughness (nm) of the exposed surface of the second polyester layer, $t_B$ is the thickness ($\mu$m) of the second polyester layer, t is the sum of $t_A$ and $t_B$, $t_A$ is the thickness ($\mu$m) of the first polyester layer, and $d_B$ is the average particle diameter ($\mu$m) of the inert fine particle lubricant contained in the second polyester layer.

Figure 1:
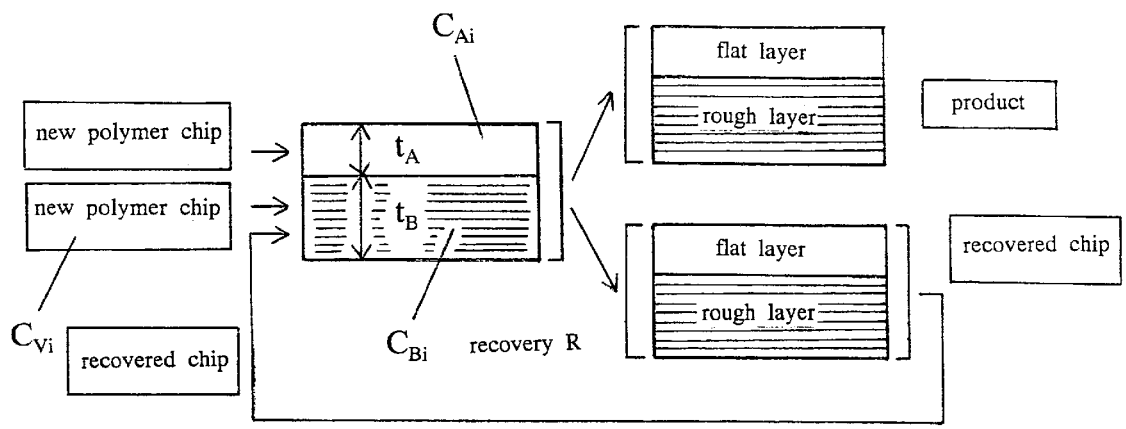
FIG. 1 is a diagram for explaining a self-recycling method.

The characteristic features of the first laminate film of the present invention will be roughly described hereinafter. The first laminate film is a laminate film which consists of a rough layer (second polyester layer) and a flat layer (first polyester layer) thinner than the rough layer, rarely experiences changes in its surface properties even when a recovered film by-produced at the time of manufacturing the laminate film is self-recycled and used for the production of the laminate film by setting the ratio of the thickness of the rough layer to the average particle diameter of a lubricant contained in the rough layer to a specific range, and moreover, has excellent electromagnetic conversion characteristics and winding properties as a base film for a high-density magnetic recording medium.

The characteristic features of the second laminate film of the present invention will be roughly described hereinafter. The second laminate film is a laminate film which consists of a rough layer (second polyester layer) and a flat layer (first polyester layer) thicker than the rough layer, rarely experiences changes in its surface properties even when a recovered film by-produced at the time of manufacturing the laminate film is self-recycled and used for the production of the laminate film by setting the ratio of the thickness of the rough layer to the average particle diameter of a lubricant contained in the rough layer to a specific range, and moreover, has excellent electromagnetic conversion characteristics and winding properties as a base film for a high-density magnetic recording medium.

A description is first given of the first laminate film of the present invention.

The polyester used in the first and second polyester layers of the present invention is preferably an aromatic polyester comprising an aromatic dicarboxylic acid as the main acid component and an aliphatic glycol as the main glycol component. The aromatic polyester is substantially linear and has film formability, especially film formability by melt molding.

Illustrative examples of the aromatic dicarboxylic acid include terephthalic acid, 2,6- and 2,7-naphthalenedicarboxylic acids, isophthalic acid, diphenoxyethane dicarboxylic acid, diphenyldicarboxylic acid, diphenyl ether dicarboxylic acid, diphenyl sulfone dicarboxylic acid, diphenyl ketone dicarboxylic acid, anthracenedicarboxylic acid and the like. Illustrative examples of the aliphatic glycol include polymethylene glycols having 2 to 10 carbon atoms such as ethylene glycol, trimethylene glycol, tetramethylene glycol, pentamethylene glycol, hexamethylene glycol and decamethylene glycol, and alicyclic diols such as cyclohexane dimethanol.

The aromatic polyester preferably comprises an alkylene terephthalate or an alkylene naphthalate as the main constituent. The polyester is particularly preferably polyethylene terephthalate, polyethylene-2,6-naphthalate or a copolymer which comprises terephthalic acid or 2,6-naphthalenedicarboxylic acid in an amount of 80 mol % or more of the total of all the dicarboxylic acid components and ethylene glycol in an amount of 80 mol % or more of the total of all the glycol components. In the latter copolymer, 20 mol % or less of the total of all the acid components may be the above aromatic dicarboxylic acid other than terephthalic acid or 2,6-naphthalenedicarboxylic acid, aliphatic dicarboxylic acid such as adipic acid or sebacic acid, or alicyclic dicarboxylic acid such as cyclohexane-1,4-dicarboxylic acid. 20 mol % or less of the total of all the glycol components may be the above glycol other than ethylene glycol, aromatic diol such as hydroquinone, resorcin or 2,2-bis(4-hydroxyphenyl)propane, aliphatic diol having an aromatic ring such as 1,4-dihydroxydimethylbenzene, or polyalkylene glycol (polyoxyalkylene glycol) such as polyethylene glycol, polypropylene glycol or polytetramethylene glycol.

The aromatic polyester of the present invention includes polyesters obtained by copolymerizing or bonding a component derived from an oxycarboxylic acid such as an aromatic oxyacid exemplified by hydroxybenzoic acid or an aliphatic oxyacid exemplified by ω-hydroxycaproic acid in an amount of 20 mol % or less based on the total of all the dicarboxylic acid components and all the oxycarboxylic acid components.

The aromatic polyester of the present invention further includes copolymers comprising a polycarboxylic acid or polyhydroxy compound having 3 or more functional groups, such as trimellitic acid or pentaerythritol, in such an amount that it is substantially linear, for example, in an amount of 2 mol % or less of the total of all the acid components.

The aromatic polyester of the present invention preferably comprises, as the copolymerized component, a sulfonic acid quaternary phosphonium salt in an amount of 0.02 to 45 mmol % (based on the total of all the acid components of the polyester). The copolymerization of this sulfonic acid quaternary phosphonium salt in the above amount makes it possible to accelerate the casting speed and retain the discharge function of a discharge electrode in the electrostatic contacting of a film. With the above amount of the sulfonic acid quaternary phosphonium salt, the AC volume resistivity of a molten film can be adjusted to $1 \times 10^6$ to $9 \times 10^8$ Ω.cm. When this AC volume resistivity is higher than $9 \times 10^8$ Ω.cm, the effect of accelerating the casting speed is small, while when the AC volume resistivity is lower than $1 \times 10^6$ Ω.cm, the breakdown of a film occurs at the time of electrostatic contacting in the casting step, undesirably.

The sulfonic acid quaternary phosphonium salt to be copolymerized is preferably a compound represented by the following formula:

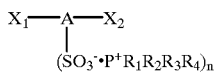

wherein A is an aromatic or aliphatic tervalent residual group, $X_1$ and $X_2$ are the same or different ester-forming functional groups or hydrogen atom, $R_1$, $R_2$, $R_3$ and $R_4$ are the same or different groups selected from the group consisting of an alkyl group and an aryl group, and n is a positive integer.

Preferred examples of the above sulfonic acid phosphonium salt include tetrabutylphosphonium 3,5-dicarboxybenzene sulfonate, tetraphenylphosphonium 3,5-dicarboxybenzene sulfonate, tetrabutylphosphonium 3,5-dicarboxymethoxybenzene sulfonate, tetraphenylphosphonium 3,5-dicarboxymethoxybenzene sulfonate, tetrabutylphosphonium 3-carboxybenzene sulfonate, tetrabutylphosphonium 3,5-di(β-hydroxyethoxycarbonyl)benzene sulfonate, tetrabutylphosphonium 4-hydroxyethoxybenzene sulfonate, bisphenol A-3,3'-di(tetrabutylphosphonium sulfonate), tetrabutylphosphonium 2,6-dicarboxynaphthalene-4-sulfonate and the like. They may be used alone or in combination of two or more. The method of copolymerizing the above sulfonic acid quaternary phosphonium salt is not particularly limited. For example, a polyester is polymerized in the presence of a sulfonic acid quaternary phosphonium salt compound to contain the compound in the polymer chain of a polyester, or a sulfonic acid quaternary phosphonium salt compound is injected and melt kneaded in an extruder simultaneous with a polyester when the polyester is injected into the extruder to be molten and extruded.

The above aromatic polyester is known per se and can be produced by a known method per se.

The above aromatic polyester preferably has an intrinsic viscosity, measured at 35° C. in o-chlorophenol, of 0.4 to 0.9, more preferably 0.5 to 0.7, particularly preferably 0.51 to 0.65.

The biaxially oriented laminate polyester film of the present invention consists of the first polyester layer and the second polyester layer. The polyesters of the two layers may be the same or different, preferably the same.

The biaxially oriented laminate polyester film of the present invention is a laminate polyester film which can be self-recycled and has a difference in surface roughness between the both surfaces. The recovered laminate polyester film can be used as part of a polymer forming the second polyester layer.

The biaxially oriented laminate polyester film of the present invention comprising the first polyester layer and the second polyester layer formed on the first polyester layer and must satisfy the following expressions (1) to (4):

$$WRa(B) > WRa(A) \quad (1)$$
$$0.5 \leq t_B/t \leq 0.9 \quad (2)$$
$$10 < t_B/d_B \leq 60 \quad (3)$$
$$t = 3 \text{ to } 10 \, \mu m \quad (4)$$

wherein WRa(A) is the center plane average roughness (nm) of the exposed surface of the first polyester layer, WRa(B) is the center plane average roughness (nm) of the exposed surface of the second polyester layer, $t_B$ is the thickness ($\mu$m) of the second polyester layer, t is the sum of $t_A$ and $t_B$, $t_A$ is the thickness ($\mu$m) of the first polyester layer, and $d_B$ is the average particle diameter ($\mu$m) of inert fine particles contained in the second polyester layer.

More preferably, the polyester of the second polyester layer is a recovered polyester having the same composition as a recovered laminate polyester film and the recovered laminate polyester film is the biaxially oriented laminate polyester film of the present invention or unstretched film thereof.

When the above recovered polyester is used in the first polyester layer, namely, the flat layer, in the production of a biaxially oriented laminate polyester film, a large inert particle lubricant contained in the rough layer (second polyester layer) for providing winding properties is contained in the first polyester layer, whereby high protrusions are formed on the flat layer (first polyester layer) to cause deterioration electromagnetic conversion characteristics, and hence, the obtained biaxially oriented laminate polyester film is not suitable as a base film for a high-density magnetic recording medium.

In the present invention, the value of $(t_B/t)$ must be in the range of 0.5 to 0.9. When the value is smaller than 0.5, the proportion of a polymer recovered from the laminate polyester film and usable for the formation of the rough layer lowers because the concentration of the inert fine particle lubricant contained in the recovered polymer is lower than the concentration of the inert fine particle lubricant contained in the second polyester layer due to the existence of the flat layer and accordingly, the concentration of the inert fine particle lubricant must be compensated to an appropriate level by supplementing a new polymer having a high concentration of the inert fine particle lubricant. As a result, the proportion of the recovered polymer is smaller than 50%. Further, the production cost of the biaxially oriented laminate polyester film increases and the application range of the film to the market narrows.

On the other hand, when the value of $(t_B/t)$ is larger than 0.9, the flat layer becomes thin, whereby the inert fine particle lubricant contained in the rough layer exerts an influence on the flat layer to roughen its flat surface. As a result, electromagnetic conversion characteristics deteriorate and hence, the obtained biaxially oriented laminate polyester film is not suitable as a base film for a high-density magnetic-recording medium.

In the present invention, $t_B/d_B$ must be in the range of 10 to 60. When $t_B/d_B$ is smaller than 10, that is, the thickness of the rough layer is too small, or when the average particle diameter of the inert fine particle lubricant contained in the rough layer is too large, the amount of the recovered polymer which can be recycled for the formation of the rough layer decreases in the former case, with the consequence that the production cost of the film increases and the application range of the film in the market narrows, whereas in the latter case, the inert fine particle lubricant contained in the rough layer exerts an influence on the flat layer to roughen its flat surface, with the consequence that electromagnetic conversion characteristics thereby deteriorate and the obtained biaxially oriented laminate polyester film is not suitable as a base film for a high-density magnetic recording medium.

When $t_B/d_B$ is large than 60, that is, the average particle diameter of the inert fine particle lubricant contained in the rough layer is too small for the thickness of the rough layer, protrusions formed on the rough layer are too low, thereby making it impossible to obtain satisfactory winding properties.

In the present invention, the second polyester layer preferably contains two or more kinds of inert fine particle lubricants having different average particle diameters. Preferably, two or more kinds of inert fine particle lubricants having different average particle diameters are of two or more different chemical species or the same chemical species and have clearly distinguishable particle size distributions. Particularly preferably, the second polyester layer contains three kinds of inert fine particles having different average particle diameters as a multi-component lubricant. The above particles include a small amount of medium-sized particles having a medium average particle diameter and a larger amount of small-sized particles than the medium-sized particles to provide slipperiness. When only small-sized particles are used as a single-component lubricant, sufficient air-squeeze properties cannot be obtained and winding properties and handling properties become unsatisfactory. When only medium- to large-sized particles are used in large quantities as a single-component lubricant, electromagnetic conversion characteristics deteriorate and when they are used in small quantities, film slipperiness becomes unsatisfactory. Therefore, both of the above characteristic properties can be hardly obtained simultaneously with a single-component lubricant.

The inert fine particle lubricant is preferably heat resistant polymer particles and/or spherical silica particles. More preferably, the inert fine particle lubricant contains heat resistant polymer particles as medium-sized particles and spherical silica particles as small-sized particles. Illustrative examples of the heat resistant polymer particles include crosslinked polystyrene resin particles, crosslinked silicone resin particles, crosslinked acrylic resin particles, crosslinked styrene-acrylic resin particles, crosslinked polyester particles, polyimide particles, melamine resin particles and the like. When crosslinked polystyrene resin particles or crosslinked silicone resin particles is contained out of these, the effect of the present invention becomes more marked advantageously.

When the above heat resistant polymer particles and spherical silica particles are used, protrusions having affinity for polyesters and relatively uniform in size are formed, thereby improving the slipperiness, chipping resistance and electromagnetic conversion characteristics of the film.

Preferably, the biaxially oriented laminate polyester film of the present invention contains a lubricant in at least the rough layer (second polyester layer) as described above, and the rough layer contains part of the polymer (recovered polymer) of a film which is by-produced and recovered at the time of producing the biaxially oriented laminate polyester film. When the second polyester layer is formed from the recovered polymer and a new polymer, the concentration ($C_{Bi}$, wt %) of the inert fine particle lubricant contained in the second polyester layer desirably satisfies the following equation:

$$C_{Bi}=(C_{Ai} \times t_A \times R + 100 \times C_{vi} \times (t_B-(t_A+t_B) \times R/100))/(t_B \times (100-R))$$

wherein $C_{Ai}$ is the concentration (wt %) of an inert fine particle lubricant contained in the first polyester layer of the recovered laminate polyester film, $C_{vi}$ is the concentration (wt %) of an inert fine particle lubricant contained in the new polyester used together with the recovered laminate polyester film for the formation of the second polyester layer, $t_A$ is the thickness (µm) of the first polyester layer of the recovered laminate polyester film, $t_B$ is the thickness (µm) of the second polyester layer of the recovered laminate polyester film, and R is the proportion (wt %) of the recovered laminate polyester film used together with the new polyester for the formation of the second polyester layer.

R is preferably 1 wt % or more to 90 wt % or less. The lowest value is more preferably 5 wt %, particularly preferably 10 wt % and extremely preferably 30-wt %. Further, the highest value is more preferably 85 wt %, particularly preferably 80 wt % and extremely preferably 70 wt %.

The above equation will be described with reference to FIG. 1.

When the biaxially oriented laminate polyester film of the present invention is manufactured and provided as a product, a biaxially oriented laminate polyester film or unstretched film thereof which has the same constitution or composition as the above biaxially oriented laminate polyester film is by-produced and recycled as a recovered chip. This recovered chip contains a lubricant "i" in a concentration lower than the concentration ($C_{Bi}$) of the lubricant "i" contained in the second polyester layer due to the existence of the flat layer (first polyester layer) containing no lubricant "i". Therefore, when this recovered chip is used, a new polyester containing the lubricant "i" in a concentration $C_{vi}$ higher than $C_{Bi}$ is used in combination to adjust the concentration of the lubricant "i" contained in the second polyester layer to $C_{Bi}$. That is, this adjustment is carried out by the above equation.

A recovered laminate polyester film which has the same composition of the lubricant "i" and the same thickness ratio of the first polyester layer to the second polyester layer as a product polyester film but has a total thickness different from that of the product polyester film may be also used as the recovered polymer (recovered chip) in FIG. 1, though a recovered laminate polyester film having the same laminate structure and composition as the laminate polyester film of the present invention is preferably used. The intrinsic viscosity of the polymer of the second polyester layer is preferably smaller than that of the polymer of the first polyester layer from the viewpoint of production cost. According to circumstances, the intrinsic viscosities of the polymers of the first and second polyester layers may be made the same value by setting the intrinsic viscosity of the new polymer used in the second polyester layer slightly higher than the intrinsic viscosity of the first polyester layer and controlling the proportion and intrinsic viscosity of the recovered polymer.

Preferably, the biaxially oriented laminate polyester film contains one or more different kinds of lubricants in the first polyester layer and two or more different kinds of lubricants in the second polyester layer. However, the present invention is not limited to this. Any biaxially oriented laminate polyester film is acceptable if it contains no lubricant in the first polyester layer and one kind of lubricant in the second polyester layer and satisfies the above expressions.

The aromatic polyester in the present invention is preferably polyethylene terephthalate or polyethylene-2,6-naphthalate. To obtain a biaxially oriented laminate film having a thickness of 3 to 6 µm and high Young's moduli, polyethylene-2,6-naphthalate is more preferred.

The surface roughness of the rough layer (second polyester layer) and the surface roughness of the flat layer (first polyester layer) of the biaxially oriented laminate polyester film of the present invention are not particularly limited. However, when the biaxially oriented laminate polyester film is used as a base film for a high-density magnetic recording medium, particularly a high-density digital recording medium, the surface roughness (WRa(A)) of the first polyester layer is preferably 3 to 8 nm, more preferably 4 to 8 nm, particularly preferably 5 to 7 nm. When WRa(A) is more than 8 nm, satisfactory electromagnetic conversion characteristics are hardly obtained. When WRa(A) is less than 3 nm, film slipperiness deteriorates and a sufficiently high slit yield is hardly obtained, and the slipperiness of a flat surface with a pass roll system in the production process of a film or tape worsens and the film or tape is wrinkled due to defective conveyance, thereby greatly reducing the product yield.

WRa(B) of the second polyester layer which is the rough layer is preferably 6 to 18 nm, more preferably 7 to 17 nm, particularly preferably 9 to 15 nm. When WRa(B) is less than 6 nm, film slipperiness deteriorates and a sufficiently high slit yield is hardly obtained. When WRa(B) is more than 18 nm, the influence of protrusions on the flat surface becomes large with the result of the roughened flat surface, and satisfactory electromagnetic conversion characteristics are hardly obtained.

Preferably, the biaxially oriented laminate polyester film of the present invention has Young's moduli in longitudinal and transverse directions each of 450 to 2,000 kg/mm$^2$ and the ratio of the Young's modulus in a longitudinal direction to the Young's modulus in a transverse direction is 0.3 to 2.5. The each of Young's moduli in longitudinal and transverse directions are more preferably 500 to 1,200 kg/mm$^2$, particularly preferably 600 to 900 kg/mm$^2$. The ratio of the Young's moduli is more preferably 0.4 to 2.0, particularly preferably 0.6 to 1.6.

When the Young's modulus in a longitudinal direction of the film is less than 450 kg/mm$^2$, the strength in a longitudinal direction of a magnetic tape becomes low, whereby the tape is easily broken when it is set in a magnetic recording device and great force is applied to it in a longitudinal direction. When the Young's modulus in a transverse direction is less than 450 kg/mm$^2$, the strength in a transverse direction of a magnetic tape becomes low, whereby contact between the tape and the magnetic head becomes weak, thereby making it difficult to obtain satisfactory electromagnetic conversion characteristics. Meanwhile, when the Young's modulus in a longitudinal or transverse direction is more than 2,000 kg/mm$^2$, the resulting film easily breaks very often due to a high draw ratio at the time of film formation, thereby reducing the product yield.

When the ratio of the Young's modulus in a longitudinal direction to the Young's modulus in a transverse direction is less than 0.3, the resulting magnetic tape hardly obtains sufficient strength in a longitudinal direction. As a result, when it is set in a magnetic recording device and great force is exerted to it in a longitudinal direction, it is easily break frequently. When the ratio is more than 2.5, the resulting magnetic tape hardly obtains sufficient strength in a transverse direction. As a result, when the tape is caused to run, tape edges are easily damaged and satisfactory durability is hardly obtained.

The ratio of the Young's modulus in a longitudinal direction to that in a transverse direction is preferably 0.9 to 2.5 when the biaxially oriented laminate polyester film is used as a base film for a magnetic recording medium of a linear system and 0.3 to 1.0 when the film is used as a base film for a magnetic recording medium of a helical system.

The total thickness of the biaxially oriented laminate polyester film of the present invention is 3 to 10 μm. This thickness is advantageous when it is used as a base film for a high-density magnetic recording medium. The thickness is preferably 4 to 9 μm, particularly preferably 4 to 7 μm. When the thickness is larger than 10 μm, the length of a magnetic tape which can be stored in a cassette becomes short and accordingly, a sufficient recording capacity cannot be obtained. When the thickness is smaller than 3 μm, the film often breaks at the time of film formation and film winding properties deteriorate, resulting in a great reduction in yield.

The biaxially oriented laminate polyester film of the present invention may be manufactured in accordance with a conventionally known method or a method which has been accumulated by the industry. For example, it can be obtained by first forming an unstretched laminate film and then, biaxially stretching the film. This unstretched laminate film can be produced by a laminate film production method which has been accumulated heretofore. For example, the second polyester layer forming a rough surface and the first polyester layer forming an opposite surface (flat surface) are laminated together while the polyesters are molten or solidified by cooling. Stated more specifically, it can be produced by coextrusion, extrusion lamination or the like.

According to the present invention, there is provided the following method as a method of producing the biaxially oriented polyester film of the present invention, wherein a recovered laminate polyester film is used as one of raw materials for the formation of the second polyester layer of the biaxially oriented laminate polyester film of the present invention.

The method of producing a biaxially oriented laminate polyester film by biaxially stretching an unstretched laminate film consisting of a first unstretched polyester layer and a second unstretched polyester layer, wherein a recovered laminate polyester film and a new polyester are used to form the second unstretched polyester layer under the condition that the following expression should be satisfied:

$$C_{Bi} = (C_{Ai} \times t_A \times R + 100 \times C_{vi}(t_B - (t_A + t_B) \times R/100))/(t_B \times (100-R))$$

wherein $C_{Bi}$ is the concentration (wt %) of an inert fine particle lubricant contained in the second unstretched polyester layer, $C_{Ai}$ is the concentration (wt %) of an inert fine particle lubricant contained in the first polyester layer of the recovered laminate polyester film, $C_{vi}$ is the concentration (wt %) of an inert fine particle lubricant contained in the new polyester used together with the recovered laminate polyester film for the formation of the second polyester layer, $t_A$ is the thickness (μm) of the first polyester layer of the recovered laminate polyester film, $t_B$ is the thickness (μm) of the second polyester layer of the recovered laminate polyester film, and R is the proportion (wt %) of the recovered laminate polyester film used together with the new polyester for the formation of the second polyester layer.

The unstretched laminate film obtained by the above method can be formed into a biaxially oriented laminate polyester film by a biaxially oriented film production method which has been accumulated heretofore. For example, polyesters are molten and coextruded at a temperature of a melting point (Tm: ° C.) to (Tm+70)° C. to obtain an unstretched laminate film which is then stretched uniaxially (in a longitudinal direction or transverse direction) to 2.5 times or more, preferably 3 times or more, at a temperature of (Tg−10) to (Tg+70)° C. (Tg: glass transition temperature of polyesters) and then in a direction perpendicular to the above stretching direction to 2.5 times or more, preferably 3.0 times or more, at a temperature of Tg to (Tg+70)° C. It may be further stretched in a longitudinal direction and/or transverse direction again as required. The total stretch ratio is preferably 9 times or more, more preferably 12 to 35 times, particularly preferably 15 to 30 times in terms of area stretch ratio. Further, the biaxially oriented laminate film may be heat set at a temperature of (Tg+70) to (Tm−10)° C., preferably 180 to 250° C. The heat setting time is preferably 1 to 60 seconds.

Preferably, the biaxially oriented laminate polyester film of the present invention contains a sulfonic acid quaternary phosphonium salt in an amount of 0.02 to 45 mmol % and has an AC volume resistivity of $1\times10^6$ to $9\times10^8$ Ω.cm, as described above. That is, pinning properties are improved at the time of film formation and high-speed film formation is made possible by containing the sulfonic acid quaternary phosphonium salt in the above amount.

The biaxially oriented laminate polyester film of the present invention is preferably used as a base film for a high-density magnetic recording medium or a high-density digital recording medium (data cartridge, digital video tape or the like). More specifically, it is advantageously used as a base film for a magnetic recording tape for digital recording mode or a magnetic recording tape for data storage.

A description is subsequently given of the second laminate film of the present invention. As for what is not described hereinafter, it should be understood that what has been described of the first laminate film of the present invention is applied directly or with slight modification obvious to one having ordinary skill in the art.

The biaxially oriented laminate polyester film of the present invention comprising a first polyester layer and a second polyester layer formed on the first polyester layer and must satisfy the following expressions (1) to (4'):

$$WRa(B) > WRa(A) \quad (1)$$

$$0.15 \leq t_B/t < 0.5 \quad (2')$$

$$10 < t_B/d_B \leq 45 \quad (3')$$

$$t = 4 \text{ to } 10 \text{ }\mu m \quad (4')$$

wherein WRa(A) is the center plane average roughness (nm) of the exposed surface of the first polyester layer, WRa(B) is the center plane average roughness (nm) of the exposed surface of the second polyester layer, $t_B$ is the thickness ($\mu$m) of the second polyester layer, t is the sum of $t_A$ and $t_B$, $t_A$ is the thickness ($\mu$m) of the first polyester layer, and $d_B$ is the average particle diameter ($\mu$m) of the inert fine particle lubricant contained in the second polyester layer.

In the present invention, when the value of $t_B/t$ is smaller than 0.15, the proportion of a polymer recovered from the laminate polyester film and usable for the formation of a second polyester layer lowers because the concentration of the inert fine particle lubricant contained in the recovered polymer is lower than the concentration of the inert fine particle lubricant contained in the second polyester layer due to the existence of the flat layer and accordingly, the concentration of the inert fine particle lubricant must be compensated to an appropriate level by supplying a new polymer having a high concentration of the inert fine particle lubricant. As a result, the proportion of the recovered polymer is smaller than 15%. Further, the production cost of the biaxially oriented laminate polyester film increases and the application range of the film to the market narrows.

When the value of ($t_B/t$) is larger than 0.5, the flat layer becomes thin, whereby the inert fine particle lubricant contained in the rough layer exerts an influence on the flat layer to roughen its flat surface. As a result, the magnetic surface is roughened to worsen electromagnetic conversion characteristics. Particularly in a high-density magnetic recording medium having a very thin magnetic layer, this roughened flat surface worsen electromagnetic conversion characteristics and hence, the obtained biaxially oriented laminate polyester film is not suitable as a base film for the high-density magnetic recording medium.

In the present invention, $t_B/d_B$ must be in the range of 10 to 45. When $t_B/d_B$ is smaller than 10, that is, the thickness of the rough layer is too small, or when the average particle diameter of the inert fine particle lubricant contained in the rough layer is too large, the amount of the recovered polymer which can be recycled for the formation of the rough layer decreases in the former case, with the consequence that the production cost of the film increases and the application range of the film in the market narrows, whereas in the latter case, the inert fine particle lubricant contained in the rough layer exerts an influence on the flat layer to roughen its flat surface, with the consequence that electromagnetic conversion characteristics deteriorate and the obtained biaxially oriented laminate polyester film is not suitable as a base film for a high-density magnetic recording medium.

When $t_B/d_B$ is large than 45, that is, the average particle diameter of the inert fine particle lubricant contained in the rough layer is too small for the thickness of the rough layer, protrusions formed on the rough layer are too low, thereby making it impossible to obtain satisfactory winding properties.

The biaxially oriented laminate polyester film of the present invention contains a lubricant in at least the rough layer (second polyester layer) as described above and the rough layer contains part of the polymer (recovered polymer) of a film which is by-produced and recovered at the time of producing the biaxially oriented laminate polyester film. When the second polyester layer is formed from the recovered polymer and a new polymer, the concentration ($C_{Bi}$, wt %) of the inert fine particle lubricant contained in the second polyester layer desirably satisfies the following equation:

$$C_{Bi} = (C_{Ai} \times t_A \times R + 100 \times C_{vi} \times (t_B - (t_A + t_B) \times R/100))/(t_B \times (100-R))$$

wherein $C_{Ai}$, $t_A$, R, $C_{vi}$ and $t_B$ are as defined hereinabove.

R is preferably 1 wt % or more to 50 wt % or less. The lowest value is more preferably 5 wt %, particularly preferably 10 wt % and extremely preferably 20 wt %. Further, the highest value is more preferably 45 wt %, particularly preferably 40 wt % and extremely preferably 30 wt %.

The surface roughness of the rough layer (second polyester layer) and the surface roughness of the flat layer (first polyester layer) of the biaxially oriented laminate polyester film of the present invention are not particularly limited. When the biaxially oriented laminate polyester film is used as a base film for a high-density magnetic recording medium, particularly a high-density digital recording medium, however, the surface roughness (WRa(A)) of the first polyester layer is preferably 1 to 5 nm, more preferably 1 to 4 nm, particularly preferably 2 to 4 nm. When WRa(A) is more than 5 nm, satisfactory electromagnetic conversion characteristics are hardly obtained. When WRa(A) is less than 1 nm, film slipperiness deteriorates and a sufficiently high slit yield is hardly obtained, and the slipperiness of a flat surface with a pass roll system in the production process of a film or tape worsens and the film or tape is wrinkled due to poor conveyance, thereby greatly reducing the product yield.

WRa(B) of the second polyester layer which is the rough layer is preferably 5 to 20 nm, more preferably 7 to 17 nm, particularly preferably 9 to 15 nm. When WRa(B) is less than 5 nm, film slipperiness deteriorates and a sufficiently high slit yield is hardly obtained. When WRa(B) is more than 20 nm, the influence of protrusions on the flat surface becomes large with the result of the roughened flat surface, and satisfactory electromagnetic conversion characteristics are hardly obtained.

According to the present invention, there is provided the following method as a method of producing the biaxially oriented polyester film of the present invention, wherein a recovered laminate polyester film is used as one of raw materials for the formation of the second polyester layer of the biaxially oriented laminate polyester film of the present invention.

The method of producing a biaxially oriented laminate polyester film by biaxially stretching an unstretched laminate polyester film consisting of a first unstretched polyester layer and a second unstretched polyester layer, wherein:

a recovered laminate polyester film and a new polyester are used to form the second unstretched polyester layer under the condition that the following expression should be satisfied:

$$C_{Bi}=(C_{Ai}\times t_A\times R+100\times C_{vi}\times(t_B-(t_A+t_B)\times R/100))/(t_B\times(100-R))$$

wherein $C_{Bi}$ is the concentration (wt %) of an inert fine particle lubricant contained in the second unstretched polyester layer, $C_{Ai}$ is the concentration (wt %) of an inert fine particle lubricant contained in the first polyester layer of the recovered laminate polyester film, $C_{vi}$ is the concentration (wt %) of an inert fine particle lubricant contained in the new polyester used together with the recovered laminate polyester film for the formation of the second polyester layer, $t_A$ is the thickness (μm) of the first polyester layer of the recovered laminate polyester film, $t_B$ is the thickness (μm) of the second polyester layer of the recovered laminate polyester film, and R is the proportion (wt %) of the recovered laminate polyester film used together with the new polyester for the formation of the second polyester layer.

EXAMPLE

The following examples are given to further illustrate the present invention.

Various physical property values and characteristic properties in the present invention were measured and defined as follows.

(1) average particle diameter of particles (DP)

The polyester is removed from the surface of the film by a low-temperature plasma ashing method (for example, model P3-3 of Yamato Kagaku Co., Ltd.) to expose particles. The treatment conditions are selected to ensure that the polyester is ashed and the particles are not damaged. The exposed particles are observed through a SEM (Scanning Electron Microscope) to analyze an image (light and shade formed by the particles) of the particles with an image analyzer. The following numerical processing is carried out with 5,000 or more particles by changing the observation site and the number average particle diameter d obtained by the equation (5) is taken as the average particle diameter.

$$d=\Sigma di/n \quad (5)$$

wherein di is the circle equivalent diameter (μm) of the particles and n is the number of the particles.

A sample is dissolved in a solvent which dissolves the polyester but not the particles, the particles are separated from the resulting solution by centrifugation, and the ratio (wt %) of the amount of the particles to the total amount is taken as the content of the particles.

(2) layer thickness

Using a secondary ion mass spectrometer (SIMS), the concentration ratio ($M^+/C^+$) of an element derived from the highest concentration particles out of the particles contained in the film of a portion from the surface layer up to a depth of 3,000 nm to the elemental carbon of the polyester is taken as a concentration of particles, and the portion from the surface layer up to a depth of 3,000 nm is analyzed in the thickness direction. The concentration of the particles is low in the surface layer which is an interface but becomes higher as the distance from the surface increases. Once having reached the maximal value, the concentration of the particles begins to decrease again. Based on this concentration distribution curve, a depth (deeper than a depth at which the concentration of the particles becomes maximal) at which the concentration of the particles in the surface layer becomes half of the maximal value is taken as the thickness of the surface layer.

Measurement conditions are as follows.

(i) measurement instrument
  secondary ion mass spectrometer (SIMS)
(ii) measurement conditions
  species of primary ion: $O_2^+$
  primary ion acceleration voltage: 12 kV
  primary ion current: 200 nA
  luster area: 400 μm□
  analytical area: 30% of gate
  degree of vacuum for measurement: 0.8 Pa ($6.0\times10^{-3}$ Torr)
  E-GUN: 0.5 kV-3.0 A When the particles which are contained in the largest amount in an area from the surface layer to a depth of 3,000 nm are organic polymer particles, it is difficult to measure them with SIMS. Therefore, the same depth profile as described above may be measured by XPS (X-ray photoelectron spectrometry), IR (infrared spectrometry) or the like, while etching from the surface, to obtain the thickness of the surface layer.

(3) total thickness of film

Ten films are placed one upon another in such a manner that dust should not be inserted therebetween, and the total thickness of the films is measured by an intermittent electronic micrometer to calculate the thickness of each film.

(4) Young's modulus

The film is cut to a width of 10 mm and a length of 15 cm, and this sample is pulled by an Instron type universal tensile tester at a chuck interval of 100 mm, a pulling rate of 10 mm/min and a chart rate of 500 mm/min. The Young's modulus is calculated from the tangent of a rising portion of the obtained load-elongation curve.

(5) electromagnetic conversion characteristics

The following commercially available devices are used to record a signal having a frequency of 7.4 MHz, the ratio of a 6.4 MHz value to a 7.4 MHz value of its reproduction signal is taken as the C/N of the tape, and the relative values of Examples 1 to 7 and Comparative Examples 1 to 3 are obtained when the C/N of Example 1 is ±0 dB and the relative values of Examples 8 to 13 and Comparative Examples 4 and 5 are obtained when the C/N of Example 10 is ±0 dB, and evaluated as follows.

⊚: +3 dB or more
  ○: +1 to +3 dB
  ×: less than +1 dB
  used devices
  8 mm video recorder: EDV-6000 of Sony Corp.
  C/N measurement: noise meter of Shibasoku Co., Ltd.

(6) slit yield

The film is slit to a width of 700 mm and a length of 7,000 m, and the slit yield when the film is wound round 20 or more rolls is obtained and evaluated based on the following criteria.

⊚: 90% or more

○: 70% or more and less than 90%

×: less than 70%

(7) surface roughness (WRa)

Using the non-contact 3-D roughness meter (NT-2000) of WYKO Co., Ltd., 10 or more measurements (n) are made under such conditions as a measurement area of 247 μm×188 μm (0.046 mm$^2$) and a measurement magnification of 25×, and the center plane surface roughness (WRa) is calculated with surface analysis software incorporated in the roughness meter.

(A) center plane average roughness (WRa)

This is a value calculated from the following expression.

$$WRa = \sum_{k=1}^{M} \sum_{j=1}^{N} |Z_{jk} - \bar{Z}|/(M \cdot N)$$

$$\text{provided } \bar{Z} = \sum_{k=1}^{M} \sum_{j=1}^{N} Z_{jk}/(M \cdot N)$$

$Z_{jk}$ is a height in the direction of the Z axis on the X and Y planes at a j-th position and a k-th position in the direction of the X axis (247 μm) and the direction of the Y axis (188 μm) perpendicular to the direction when these directions are divided into M and N sections, respectively.

(8) film cost

This is judged based on the recovered polymer.

⊚: recovery (R) of 50% or more.

○: recovery (R) of 30% or more and less than 50%.

Δ: recovery (R) of 10% or more and less than 30%.

×: recovery (R) of less than 10%.

(9) friction coefficient of film

A glass plate is fixed under a set of two films, a lower film (film in contact with the glass plate) of the set is pulled with a low-speed roll (about 10 cm/min), and a detector is fixed at one end of an upper film (opposite end in the pulling direction of the lower film) to detect initial tensile force between the films. A sled used has a weight of 1 kg and a lower area of 100 cm$^2$.

The friction coefficient (μs) is obtained from the following equation:

μs=initial tensile force (kg)/load of 1 kg

(10) measurement of volume resistivity

Figure 2:
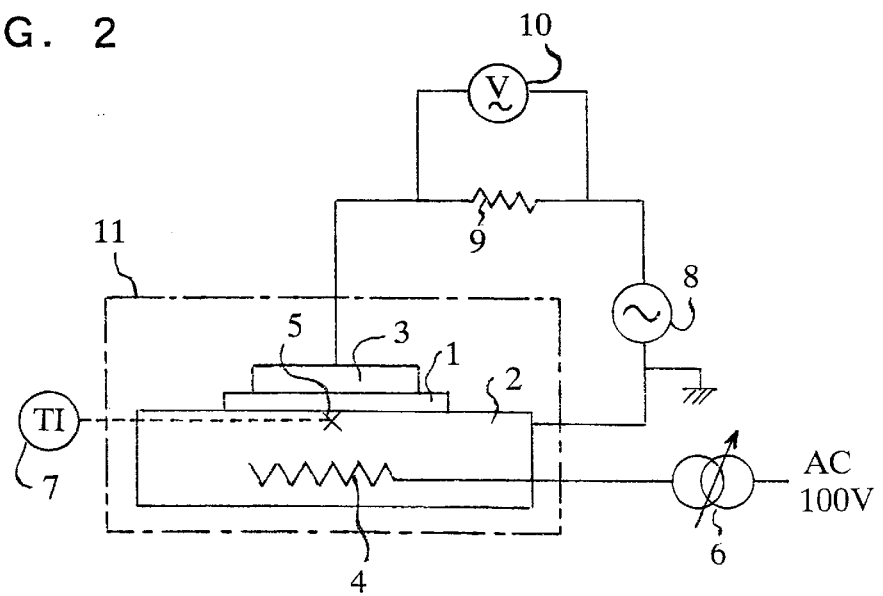
FIG. 2 is a typified diagram showing an apparatus for measuring the volume resistivity of a molten polymer.

The volume resistivity of a molten film is measured using an apparatus shown in FIG. 2. A measurement sample 1 is a film having a thickness of about 150 μm. An upper electrode 3 having a diameter of 5.6 cm and a thickness of 0.2 cm is placed above a cylindrical lower electrode 2 having a diameter of 20 cm with a parallel space of 150 μm therebetween, and the measurement sample is inserted between these electrodes in such a manner that it comes in close contact with these.

The lower electrode 2 incorporates a charger 4 and a temperature detection end 5 and differences in the surface temperature of the lower electrode on the measurement plane are controlled to 1° C. or less and a difference between the surface temperature of the lower electrode and the temperature of the detection end portion is controlled to 2° C. or less at a temperature elevation rate of 8° C./min. The detection temperature is measured with a read thermometer 7. The whole electrodes are placed in a heat insulating container 11.

Voltage generated from a power source 8 is applied to the both electrodes through a standard resistor 9. When the DC volume resistivity of the film is to be measured, the power source generates DC 100 V and when the AC volume resistivity of the film is to be measured, the power source generates 100 V at 50 Hz. A current running through the circuit is obtained by reading a voltage generated at both ends of the standard resistor with an electron meter 10 having an internal impedance of 100 MΩ or more.

The AC volume resistivity of the film-like polymer is measured with the above apparatus at a temperature elevation rate of the lower electrode of 8° C./min by setting the temperature of the above electrode to the melting point of the polymer measured by DSC+30° C., and the AC volume resistivity Z is obtained from the following equation based on applied voltage E, current I, electrode area S and space d between electrodes.

$$Z = \frac{E}{I} \cdot \frac{S}{d}$$

Example 1

Dimethyl-2,6-naphthalate and ethylene glycol were polymerized in accordance with a commonly used method by adding manganese acetate as an ester exchange catalyst, antimony trioxide as a polymerization catalyst, phosphorous acid as a stabilizer and additive particles shown in Table 1 as a lubricant to obtain a new chip for a flat layer (layer A) having an intrinsic viscosity (in o-chlorophenol, at 35° C.) of 0.61. Meanwhile, a chip recovered from the laminate film itself and a new chip shown in Table 1 were used as chips for a rough layer (layer B) in a ratio shown in Table 1. A sulfonic acid quaternary phosphonium salt compound was contained in the new chips for the layers A and B in an amount of 2 mmol %.

These polymers for the layers A and B were dried at 170° C. for 6 hours. The dried chips were supplied to the hoppers of two extruders in such a ratio that the layer thickness structure shown in Table 1 was obtained, molten at a temperature of 280 to 300° C., laminated together with a multi-manifold coextrusion die in such a manner that the layer B was placed upon one side of the layer A, and extruded onto a rotary cooling drum having a surface finish of about 0.3 s and a surface temperature of 60° C. to obtain an unstretched laminate film having a thickness of 91 μm.

This unstretched laminate film had an AC volume resistivity of 4×10$^8$ Ω.cm.

The thus obtained unstretched laminate film was preheated at 120° C., stretched to 5.2 times between low-speed and high-speed rolls by heating with an IR heater having a surface temperature of 900° C. 15 mm from above, quenched and subsequently, supplied to a stenter to be stretched to 3.9 times in a transverse direction at 145° C. The obtained biaxially oriented film was heat set with hot air heated at 210° C. for 4 seconds to obtain a biaxially oriented laminate polyester film having a thickness of 4.5 μm. The film had a Young's modulus in a longitudinal direction of 8,826 MPa (900 kg/mm$^2$) and a Young's modulus in a transverse direction of 5,884 MPa (600 kg/mm$^2$).

The following magnetic coating was applied to one side (layer A) of this biaxially oriented laminate polyester film to a thickness of 0.5 μm, subjected to alignment treatment in a DC magnetic field of 2,500 Gauss, dried by heating at 100° C., and to supercalendering (linear pressure of 300 kg/cm, temperature of 80° C.) and wound up. The wound roll was kept in an oven heated at 55° C. for 3 days and cut to a width of 8 mm to obtain a magnetic tape.

Preparation of the magnetic coating:

The following composition was placed in a ball mill to be kneaded for 16 hours and dispersed, and 5 parts by weight of an isocyanate compound (Desmodur of Bayer AG) was added and dispersed by high-speed shearing for 1 hour to obtain a magnetic coating.

| composition of magnetic coating: | parts by weight |
|---|---|
| needle-like Fe particles | 100 |
| vinyl chloride-vinyl acetate copolymer (Slec 7A of Sekisui Chemical Co., Ltd.) | 15 |
| thermoplastic polyurethane resin | 5 |
| chromium oxide | 5 |
| carbon black | 5 |
| lecithin | 2 |
| fatty acid ester | 1 |
| toluene | 50 |
| methyl ethyl ketone | 50 |
| cyclohexanone | 50 |

The obtained magnetic tape was measured for its electromagnetic conversion characteristics in accordance with the above measurement method. The results are shown in Table 1.

Comparative Examples 1 to 3

Biaxially oriented laminate polyester films were obtained in the same manner as in Example 1 except that lubricant particles added, the layer thickness structure and the proportion of a recovered polymer were changed as shown in Table 1. Magnetic tapes were obtained from the obtained biaxially oriented laminate polyester films in the same manner as in Example 1. The measurement results of characteristic properties of the films are shown in Table 1.

Examples 2 to 7

Laminate films were obtained in the same manner as in Example 1 except that lubricant particles added, the layer thickness structure, the proportion of a recovered polymer and Young's moduli were changed as shown in Table 1. To obtain these Young's moduli, the draw ratio in a longitudinal direction was set to 5.1 times and the draw ratio in a transverse direction was set to 4.9 times in Examples 2, 4, 5 and 6, the draw ratio in a longitudinal direction was set to 4.8 times and the draw ratio in a transverse direction was set to 5.2 times in Example 3, and the draw ratio in a longitudinal direction was set to 4.0 times and the draw ratio in a transverse direction was set to 5.4 times in Example 7.

Magnetic tapes were obtained from the obtained biaxially oriented laminate polyester films in the same manner as in Example 1. The measurement results of characteristic properties are shown in Table 1.

As is obvious from Table 1, the biaxially oriented laminate polyester films of the present invention have excellent characteristic properties such as electromagnetic conversion characteristics, winding properties and film cost, as a base film for a high-density magnetic recording medium.

TABLE 1

| | | Ex.1 | Ex.2 | Ex.3 | Ex.4 | Ex.5 |
|---|---|---|---|---|---|---|
| layer thickness structure | | | | | | |
| total thickness | μm | 4.5 | 6.0 | 4.5 | 6.0 | 6.0 |
| thickness of layer A | μm | 1.5 | 2.0 | 1.5 | 2.0 | 2.0 |
| thickness of layer B | μm | 3.0 | 4.0 | 3.0 | 4.0 | 4.0 |
| proportion of thickness of layer B | % | 67 | 67 | 67 | 67 | 67 |
| Young's moduli | | | | | | |
| longitudinal direction | MPa | 8826 | 7846 | 6865 | 7846 | 7846 |
| transverse direction | MPa | 5884 | 6375 | 7159 | 6375 | 6375 |
| self-recycling method | | | | | | |
| layer from which recovered polymer is obtained | | layer B | layer B | layer B | layer B | layer B |
| layer A | | | | | | |
| proportion of polymer of layer A | % | 33 | 33 | 33 | 33 | 33 |
| composition of polymer of layer A | | | | | | |
| particles II | | | | | | |
| species of lubricant | | spherical silica | spherical silica | spherical silica | spherical silica | spherical silica |
| average particle diameter | μm | 0.14 | 0.14 | 0.14 | 0.14 | 0.14 |
| amount added | wt % | 0.10 | 0.10 | 0.15 | 0.10 | 0.10 |
| layer B | | | | | | |
| proportion of polymer of layer B | % | 67 | 67 | 67 | 67 | 67 |
| proportion of recovered polymer | % | 50 | 50 | 50 | 50 | 50 |
| proportion of new polymer | % | 17 | 17 | 17 | 17 | 17 |
| composition of polymer of layer B | | | | | | |
| composition of new polymer | | | | | | |
| particle I | | | | | | |
| species of lubricant | | spherical silica | spherical silica | spherical silica | spherical silica | spherical silica |
| average particle diameter | μm | 0.30 | 0.30 | 0.30 | 0.30 | 0.30 |
| amount added | wt % | 0.300 | 0.300 | 0.400 | 0.100 | 0.500 |

TABLE 1-continued

|  |  |  |  |  |  |  |
|---|---|---|---|---|---|---|
| particle II |  |  |  |  |  |  |
| species of lubricant |  | spherical silica | spherical silica | spherical silica | spherical silica | spherical silica |
| average particle diameter | μm | 0.14 | 0.14 | 0.14 | 0.14 | 0.14 |
| amount added | wt % | 0.300 | 0.300 | 0.350 | 0.300 | 0.300 |
| final composition of polymer of layer B |  |  |  |  |  |  |
| amount of particles I | wt % | 0.150 | 0.150 | 0.200 | 0.050 | 0.250 |
| amount of particles II | wt % | 0.200 | 0.200 | 0.250 | 0.200 | 0.200 |
| average particle diameter of all particles | μm | 0.15 | 0.15 | 0.15 | 0.14 | 0.16 |
| $t_B/d_B$ | — | 20 | 27 | 20 | 29 | 25 |
| surface roughness |  |  |  |  |  |  |
| layer A WRa(A) | nm | 6.1 | 5.7 | 5.0 | 4.1 | 7.6 |
| layer B WRa(B) | nm | 11.2 | 11.5 | 11.5 | 6.9 | 16.8 |
| film friction coefficient | — | 0.35 | 0.34 | 0.34 | 0.38 | 0.31 |
| electromagnetic conversion characteristics | — | ±0 db | ○ | ○ | ◎ | Δ |
| slit yield | — | ○ | ○ | ○ | Δ | ◎ |
| film cost | — | ◎ | ◎ | ◎ | ◎ | ◎ |

|  |  | Ex.6 | Ex.7 | C.Ex.1 | C.Ex.2 | C.Ex.3 |
|---|---|---|---|---|---|---|
| layer thickness structure |  |  |  |  |  |  |
| total thickness | μm | 6.0 | 4.5 | 4.5 | 4.5 | 6.0 |
| thickness of layer A | μm | 1.0 | 2.0 | 3.5 | 0.3 | 2.0 |
| thickness of layer B | μm | 5.0 | 2.5 | 1.0 | 4.2 | 4.0 |
| proportion of thickness of layer B | % | 83 | 56 | 22 | 93 | 67 |
| Young's moduli |  |  |  |  |  |  |
| longitudinal direction | MPa | 7846 | 5394 | 8826 | 8826 | 8826 |
| transverse direction | MPa | 6375 | 11768 | 5884 | 5884 | 5884 |
| self-recycling method |  |  |  |  |  |  |
| layer from which recovered polymer is obtained | | layer B | layer B | layer B | layer B | layer B |
| layer A |  |  |  |  |  |  |
| proportion of polymer of layer A | % | 17 | 44 | 78 | 7 | 33 |
| composition of polymer of layer A |  |  |  |  |  |  |
| particles II |  |  |  |  |  |  |
| species of lubricant |  | spherical silica | spherical silica | spherical silica | spherical silica | spherical silica |
| average particle diameter | μm | 0.09 | 0.20 | 0.14 | 0.14 | 0.06 |
| amount added | wt % | 0.15 | 0.05 | 0.10 | 0.10 | 0.10 |
| layer B |  |  |  |  |  |  |
| proportion of polymer of layer B | % | 83 | 56 | 22 | 93 | 67 |
| proportion of recovered polymer | % | 70 | 40 | 5 | 80 | 50 |
| proportion of new polymer | % | 13 | 16 | 17 | 13 | 17 |
| composition of polymer of layer B |  |  |  |  |  |  |
| composition of new polymer |  |  |  |  |  |  |
| particle I |  |  |  |  |  |  |
| species of lubricant |  | spherical silica | crosslinked silicone | spherical silica | spherical silica | spherical silica |
| average particle diameter | μm | 0.25 | 0.50 | 0.30 | 0.30 | 0.30 |
| amount added | wt % | 0.300 | 0.060 | 0.184 | 0.210 | 0.300 |
| particle II |  |  |  |  |  |  |
| species of lubricant |  | spherical silica | spherical silica | spherical silica | spherical silica | spherical silica |
| average particle diameter | μm | 0.09 | 0.20 | 0.14 | 0.14 | 0.06 |
| amount added | wt % | 0.450 | 0.350 | 0.223 | 0.240 | 0.300 |
| final composition of polymer of layer B |  |  |  |  |  |  |
| amount of particles I | wt % | 0.160 | 0.028 | 0.150 | 0.150 | 0.150 |
| amount of particles II | wt % | 0.310 | 0.190 | 0.200 | 0.200 | 0.200 |
| average particle diameter of all particles | μm | 0.09 | 0.20 | 0.15 | 0.15 | 0.06 |
| $t_B/d_B$ | — | 58 | 13 | 7 | 28 | 67 |
| surface roughness |  |  |  |  |  |  |
| layer A WRa(A) | nm | 7.9 | 5.0 | 3.4 | 10.2 | 2.7 |
| layer B WRa(B) | nm | 12.4 | 7.5 | 9.3 | 11.8 | 9.5 |
| film friction coefficient | — | 0.40 | 0.41 | 0.36 | 0.34 | 0.46 |
| electromagnetic conversion characteristics | — | Δ | ○ | ◎ | X | ◎ |

TABLE 1-continued

| | | | | | | |
|---|---|---|---|---|---|---|
| slit yield | — | △ | △ | ◯ | ◯ | X |
| film cost | — | ◎ | ◯ | X | ◎ | ◎ |

Ex.: Example
C.Ex.: Comparative Example

Example 8

Dimethyl-2,6-naphthalate and ethylene glycol were polymerized in accordance with a commonly used method by adding manganese acetate as an ester exchange catalyst, antimony trioxide as a polymerization catalyst, phosphorous acid as a stabilizer and additive particles shown in Table 2 as a lubricant to obtain a new chip for a flat layer (layer A) having an intrinsic viscosity (in o-chlorophenol, at 35° C.) of 0.61. Meanwhile, a chip recovered from the laminate film itself and a new chip shown in Table 2 were used as chips for a rough layer (layer B) in a ratio shown in Table 2. A sulfonic acid quaternary phosphonium salt compound was contained in the new chips for the layers A and B in an amount of 2 mmol %.

These polymers for the layers A and B were dried at 170° C. for 6 hours. The dried chips were supplied to the hoppers of two extruders in such a ratio that the layer thickness structure shown in Table 2 was obtained, molten at a temperature of 280 to 300° C., laminated together with a multi-manifold coextrusion die in such a manner that the layer B was placed upon one side of the layer A, and extruded onto a rotary cooling drum having a surface finish of about 0.3 s and a surface temperature of 60° C. to obtain an unstretched laminate film having a thickness of 212 μm.

This unstretched laminate film had an AC volume resistivity of $4 \times 10^8$ Ω.cm.

The thus obtained unstretched laminate film was preheated at 120° C., stretched to 5.1 times between low-speed and high-speed rolls by heating with an IR heater having a surface temperature of 900° C. 15 mm from above, quenched and supplied to a stenter to be stretched to 4.9 times in a transverse direction at 145° C. The obtained biaxially oriented film was heat set with hot air heated at 210° C. for 4 seconds to obtain a biaxially oriented laminate polyester film having a thickness of 4.5 μm. The film had a Young's modulus in a longitudinal direction of 7,846 MPa (800 kg/mm²) and a Young's modulus in a transverse direction of 6,375 MPa (650 kg/mm²).

The following magnetic coating was applied to one side (layer A) of this biaxially oriented laminate polyester film to a thickness of 0.2 μm, subjected to alignment treatment in a DC magnetic field of 2,500 Gauss, dried by heating at 100° C., and to supercalendering (linear pressure of 300 kg/cm, temperature of 80° C.) and wound up. The wound roll was kept in an oven heated at 55° C. for 3 days and cut to a width of 8 mm to obtain a magnetic tape.

The obtained magnetic tape was measured for its electromagnetic conversion characteristics in accordance with the above measurement method. The results are shown in Table 2.

Examples 9 to 15 and Comparative Examples 4 and 5

Laminate films were obtained in the same manner as in Example 8 except that lubricant particles added, the layer thickness structure, the proportion of a recovered polymer and Young's moduli were changed as shown in Table 2. To obtain these Young's moduli, the draw ratio in a longitudinal direction was set to 5.1 times and the draw ratio in a transverse direction was set to 4.9 times in Example 9, the draw ratio in a longitudinal direction was set to 5.2 times and the draw ratio in a transverse direction was set to 3.9 times in Examples 11 to 13 and Comparative Examples 4 and 5, the draw ratio in a longitudinal direction was set to 4.8 times and the draw ratio in a transverse direction as set to 5.2 times in Example 10, the draw ratio in a longitudinal direction was set to 3.5 times and the draw ratio in a transverse direction as set to 5.8 times in Example 14, and the draw ratio in a longitudinal direction was set to 4.0 times and the draw ratio in a transverse direction as set to 5.4 times in Example 15.

Magnetic tapes were obtained from the obtained biaxially oriented laminate polyester films in the same manner as in Example 8. The measurement results of characteristic properties are shown in Table 2.

As is obvious from Table 2, the biaxially oriented laminate polyester films of the present invention have excellent characteristic properties such as electromagnetic conversion characteristics, winding properties and film cost, as a base film for a high-density magnetic recording medium.

TABLE 2

| | | Ex.8 | Ex.9 | Ex.10 | Ex.11 | Ex.12 |
|---|---|---|---|---|---|---|
| layer thickness structure | | | | | | |
| total thickness | μm | 8.5 | 6.0 | 6.0 | 6.0 | 8.5 |
| thickness of layer A | μm | 6.7 | 4.2 | 4.2 | 3.2 | 4.5 |
| thickness of layer B | μm | 1.8 | 1.8 | 1.8 | 2.8 | 4.0 |
| proportion of thickness of layer B | % | 21 | 30 | 30 | 47 | 47 |
| Young's moduli | | | | | | |
| longitudinal direction | MPa | 7846 | 7846 | 6865 | 8826 | 8826 |
| transverse direction | MPa | 6375 | 6375 | 7159 | 5884 | 5884 |
| self-recycling method | | | | | | |
| layer from which recovered polymer is obtained | | layer B | layer B | layer B | layer B | layer B |

TABLE 2-continued

| layer A | | | | | | |
|---|---|---|---|---|---|---|
| proportion of polymer of layer A | % | 79 | 70 | 70 | 53 | 53 |
| composition of polymer of layer A | | | | | | |
| particles II | | | | | | |
| species of lubricant | | spherical silica | spherical silica | spherical silica | spherical silica | spherical silica |
| average particle diameter | μm | 0.14 | 0.14 | 0.14 | 0.14 | 0.09 |
| amount added | wt % | 0.01 | 0.01 | 0.10 | 0.10 | 0.15 |
| layer B | | | | | | |
| proportion of polymer of layer B | % | 21 | 30 | 30 | 47 | 47 |
| proportion of recovered polymer | % | 10 | 15 | 15 | 35 | 35 |
| proportion of new polymer | % | 11 | 15 | 15 | 12 | 12 |
| composition of polymer of layer B | | | | | | |
| composition of new polymer | | | | | | |
| particle I | | | | | | |
| species of lubricant | | spherical silica | spherical silica | spherical silica | spherical silica | spherical silica |
| average particle diameter | μm | 0.30 | 0.30 | 0.30 | 0.30 | 0.25 |
| amount added | wt % | 0.425 | 0.255 | 0.255 | 0.390 | 0.406 |
| particle II | | | | | | |
| species of lubricant | | spherical silica | spherical silica | spherical silica | spherical silica | spherical silica |
| average particle diameter | μm | 0.14 | 0.14 | 0.14 | 0.14 | 0.09 |
| amount added | wt % | 0.385 | 0.333 | 0.270 | 0.360 | 0.556 |
| final composition of polymer of layer B | | | | | | |
| amount of particles I | wt % | 0.250 | 0.150 | 0.150 | 0.150 | 0.160 |
| amount of particles II | wt % | 0.230 | 0.200 | 0.200 | 0.200 | 0.310 |
| average particle diameter of all particles | μm | 0.16 | 0.15 | 0.15 | 0.15 | 0.10 |
| $t_B/d_B$ | — | 11 | 12 | 12 | 19 | 40 |
| surface roughness | | | | | | |
| layer A WRa(A) | nm | 2.2 | 1.5 | 3.2 | 4.4 | 4.3 |
| layer B WRa(B) | nm | 10.5 | 10.7 | 10.6 | 10.9 | 11.7 |
| film friction coefficient | — | 0.40 | 0.43 | 0.35 | 0.34 | 0.38 |
| electromagnetic conversion characteristics | — | ⊚ | ⊚ | ±0 db | Δ | Δ |
| slit yield | — | Δ | Δ | ○ | ○ | Δ |
| film cost | — | Δ | Δ | Δ | ○ | ○ |

| | | Ex.13 | Ex.14 | Ex.15 | C.Ex.4 | C.Ex.5 |
|---|---|---|---|---|---|---|
| layer thickness structure | | | | | | |
| total thickness | μm | 6.0 | 6.0 | 4.5 | 6.0 | 6.0 |
| thickness of layer A | μm | 4.2 | 4.2 | 2.7 | 5.3 | 3.2 |
| thickness of layer B | μm | 1.8 | 1.8 | 1.8 | 0.7 | 2.8 |
| proportion of thickness of layer B | % | 30 | 30 | 40 | 12 | 47 |
| Young's moduli | | | | | | |
| longitudinal direction | MPa | 8826 | 5394 | 5884 | 8826 | 8826 |
| transverse direction | MPa | 5884 | 11768 | 8826 | 5884 | 5884 |
| self-recycling method | | | | | | |
| layer from which recovered polymer is obtained | | layer B | layer B | layer B | layer B | layer B |
| layer A | | | | | | |
| proportion of polymer of layer A | % | 70 | 70 | 60 | 88 | 53 |
| composition of polymer of layer A | | | | | | |
| particles II | | | | | | |
| species of lubricant | | spherical silica | spherical silica | spherical silica | spherical silica | spherical silica |
| average particle diameter | μm | 0.14 | 0.14 | 0.14 | 0.14 | 0.06 |
| amount added | wt % | 0.10 | 0.10 | 0.01 | 0.10 | 0.10 |
| layer B | | | | | | |
| proportion of polymer of layer B | % | 30 | 30 | 40 | 12 | 47 |
| proportion of recovered polymer | % | 15 | 15 | 25 | 5 | 35 |
| proportion of new polymer | % | 15 | 15 | 15 | 7 | 12 |

TABLE 2-continued composition of polymer of layer B
composition of new polymer
particle I

| species of lubricant | | spherical silica | crosslinked silicone | spherical silica | spherical silica | spherical silica |
|---|---|---|---|---|---|---|
| average particle diameter | μm | 0.30 | 0.50 | 0.30 | 0.30 | 0.30 |
| amount added | wt % | 0.425 | 0.051 | 0.500 | 0.249 | 0.390 |
| particle II | | | | | | |
| species of lubricant | | spherical silica | spherical silica | spherical silica | spherical silica | spherical silica |
| average particle diameter | μm | 0.14 | 0.14 | 0.14 | 0.14 | 0.06 |
| amount added | wt % | 0.270 | 0.270 | 0.450 | 0.266 | 0.360 |
| final composition of polymer of layer B | | | | | | |
| amount of particles I | wt % | 0.250 | 0.030 | 0.250 | 0.150 | 0.150 |
| amount of particles II | wt % | 0.200 | 0.200 | 0.230 | 0.200 | 0.200 |
| average particle diameter of all particles | μm | 0.16 | 0.14 | 0.16 | 0.15 | 0.06 |
| $t_B/d_B$ | — | 11 | 13 | 11 | 5 | 47 |
| surface roughness | | | | | | |
| layer A WRa(A) | nm | 4.2 | 2.3 | 2.2 | 2.5 | 2.1 |
| layer B WRa(B) | nm | 15.9 | 6.3 | 10.7 | 8.7 | 9.2 |
| film friction coefficient | — | 0.32 | 0.39 | 0.42 | 0.35 | 0.46 |
| electromagnetic conversion characteristics | — | Δ | ⊚ | ⊚ | ⊚ | ⊚ |
| slit yield | — | ⊚ | Δ | Δ | ○ | X |
| film cost | — | Δ | ○ | Δ | X | ○ |

Ex.: Example
C.Ex.: Comparative Example

What is claimed is:

1. A biaxially oriented laminate polyester film comprising a first polyester layer and a second polyester layer, wherein the first polyester layer has a thickness ($t_A$) of 2 to 8.5 μm, the second polyester layer contains an inert fine particle lubricant and has a thickness ($t_B$) of 0.6 to 5 μm, and the first polyester layer and the second polyester layer satisfy the following expressions (1) to (4'):

$$WRa(B) > WRa(A) \quad (1)$$

$$0.15 \leq t_B/t < 0.5 \quad (2')$$

$$10 < t_B/d_B \leq 45 \quad (3')$$

$$t = 4 \text{ to } 10 \text{ μm} \quad (4)$$

wherein WRa(a) is the center plane average roughness (nm) of the exposed surface of the first polyester layer, WRa(B) is the center plane average roughness (nm) of the exposed surface of the second polyester layer, $t_B$ is the thickness (μm) of the second polyester layer, t is the sum of $t_A$ and $t_B$, $t_A$ is the thickness (μm) of the first polyester layer, and $d_B$ is the average particle diameter (μm) of the inert fine particle lubricant contained in the second polyester layer.

2. The biaxially oriented laminate polyester film of claim 1, wherein WRa(A) is in the range of 1 to 5 nm and WRa(B) is in the range of 6 to 18 nm.

3. The biaxially oriented laminate polyester film of claim 1, wherein the intrinsic viscosity of the polyester of the second polyester layer is lower than the intrinsic viscosity of the polyester of the first polyester layer.

4. The biaxially oriented laminate polyester film of claim 1, wherein the polyester of the second polyester layer comprises a recovered polyester having the same composition as a recovered laminate polyester film which is the biaxially oriented laminate polyester film of claim 1 or an unstretched film thereof.

5. The biaxially oriented laminate polyester film of claim 4, wherein the thickness ratio of the first polyester layer to the second polyester layer is the same as the thickness ratio of the first polyester layer to the second polyester layer of the recovered laminate polyester film.

6. The biaxially oriented laminate polyester film of claim 1, wherein the second polyester layer is formed from a recovered laminate polyester film and a new polyester to ensure that the concentration ($C_{Bi}$, wt %) of the inert fine particle lubricant contained in the second polyester layer should satisfy the following equation:

$$C_{Bi} = (C_{Ai} \times t_A \times R + 100 \times C_{vi} \times (t_B - (t_A + t_B) \times R/100))/(t_B \times (100-R))$$

wherein $C_{Ai}$ is the concentration (wt %) of an inert fine particle lubricant contained in the first polyester layer of the recovered laminate polyester film, $C_{vi}$ is the concentration (wt %) of an inert fine particle lubricant contained in the new polyester used together with the recovered laminate polyester film for the formation of the second polyester layer, $t_A$ is the thickness (μm) of the first polyester layer of the recovered laminate polyester film, $t_B$ is the thickness (μm) of the second polyester layer of the recovered laminate polyester film, and R is the proportion (wt %) of the recovered laminate polyester film used together with the new polyester for the formation of the second polyester layer.

7. The biaxially oriented laminate polyester film of claim 6, wherein R is 1 to 50 wt %.

8. The biaxially oriented laminate polyester film of claim 6 which has the same laminate structure and composition as the recovered laminate polyester film.

9. The biaxially oriented laminate polyester film of claim 1, wherein the second polyester layer contains two or more kinds of inert fine particle lubricants having different average particle diameters which (i) are of two or more different chemical species or (ii) are of the same chemical species and have distinguishable particle size distributions.

10. The biaxially oriented laminate polyester film of claim 1, wherein the Young's moduli in longitudinal and transverse directions of the film are both in the range of 4,413 to 19,614 MPa (450 to 2,000 kg/mm$^2$) and the ratio of the Young's modulus in a longitudinal direction to the Young's modulus in a transverse direction is in the range of 0.3 to 2.5.

11. The biaxially oriented laminate polyester film of claim 1, wherein a polyester forming the first polyester layer and the second polyester layer is polyethylene-2,6-naphthalene dicarboxylate.

12. The biaxially oriented laminate polyester film of claim 1, wherein a polyester forming the first polyester layer and/or the second polyester layer contains, as the copolymerized component, a sulfonic acid quaternary phosphonium salt in an amount of 0.02 to 45 mmol % and has an AC volume resistivity of $1 \times 10^6$ to $9 \times 10^8$ Ω.cm.

13. The biaxially oriented laminate polyester film of claim 1 which is a base film for a magnetic recording tape for digital recording.

14. The biaxially oriented laminate polyester film of claim 1 which is a base film for a magnetic recording tape for data storage.

15. A method of producing the biaxially oriented laminate polyester film of claim 1 by biaxially stretching an unstretched laminate polyester film consisting of a first unstretched polyester layer and a second unstretched polyester layer, wherein a recovered laminate polyester film and a new polyester are used to form the second unstretched polyester layer under the condition that the following expression should be satisfied:

$$C_{Bi} = (C_{Ai} \times t_A \times R + 100 C_{vi} \times (t_B - (t_A + t_B) \times R/100))/(t_B \times (100-R))$$

wherein $C_{Bi}$ is the concentration (wt %) of an inert fine particle lubricant contained in the second unstretched polyester layer, $C_{Ai}$ is the concentration (wt %) of an inert fine particle lubricant contained in the first polyester layer of the recovered laminate polyester film, $C_{vi}$ is the concentration (wt %) of an inert fine particle lubricant contained in the new polyester used together with the recovered laminate polyester film for the formation of the second polyester layer, $t_A$ is the thickness (μm) of the first polyester layer of the recovered laminate polyester film, $t_B$ is the thickness (μm) of the second polyester layer of the recovered laminate polyester film, and R is the proportion (wt %) of the recovered laminate polyester film used together with the new polyester for the formation of the second polyester layer.

* * * * *